United States Patent [19]

Flotow

[11] Patent Number: 4,860,872
[45] Date of Patent: Aug. 29, 1989

[54] FRICTION DISC ASSEMBLY

[75] Inventor: Richard A. Flotow, Butler, Ind.

[73] Assignee: Dana Corporation, Toledo, Ohio

[21] Appl. No.: 132,393

[22] Filed: Dec. 15, 1987

[51] Int. Cl.$^4$ ............................................. F16D 13/60
[52] U.S. Cl. ............................ 192/107 R; 192/70.13;
192/107 M; 188/73.1; 188/218 XL
[58] Field of Search ............. 192/70.14, 70.13, 107 M,
192/107 R; 188/218 XL, 73.1, 73.2

[56] References Cited

U.S. PATENT DOCUMENTS

| | | | |
|---|---|---|---|
| 2,033,835 | 3/1936 | Lansing | 192/104 |
| 2,191,460 | 2/1940 | Fisher | 292/107 M |
| 3,194,347 | 7/1965 | Hall | 188/18 |
| 3,221,853 | 12/1965 | Batchelor et al. | 192/107 M |
| 3,412,836 | 11/1968 | Wilmer | 192/107 |
| 3,422,936 | 1/1969 | Marcheron | 188/218 |
| 3,433,334 | 3/1969 | Kershner | 188/218 |
| 3,452,844 | 7/1969 | Lallemant | 188/218 |
| 3,613,851 | 10/1971 | Ely et al. | 188/218 XL |
| 3,625,319 | 12/1971 | Krause | 192/107 R |
| 3,746,139 | 7/1973 | Bok et al. | 192/107 |
| 3,807,534 | 4/1974 | Eldred | 188/73.2 |
| 3,948,364 | 4/1976 | Lowey | 188/251 |
| 3,986,588 | 10/1976 | Kuzarov | 192/16 |
| 4,013,147 | 3/1977 | Anderson | 188/218 |
| 4,119,179 | 10/1978 | Masclet | 188/73.2 |
| 4,132,294 | 1/1979 | Poli | 192/70.13 |
| 4,173,681 | 11/1979 | Durrieu et al. | 428/409 |
| 4,326,614 | 4/1982 | Matagrano | 192/70.13 |
| 4,508,199 | 4/1985 | Herbulot et al. | 188/250 |
| 4,613,021 | 9/1986 | Lacombe et al. | 188/218 |

Primary Examiner—Leslie A. Braun
Assistant Examiner—Nicholas Whitelaw
Attorney, Agent, or Firm—F. B. McDonald

[57] ABSTRACT

A friction disc assembly includes a plurality of one piece or unitary friction elements each containing a pair of opposed planar friction surfaces. Each element is adapted for being supported within an opening of a clutch driven disc, wherein a pair of backing plates virtually supports each disc by trapping same within pairs of aligned openings. In a preferred form, the backing plates comprise an interference fit with the axially aligned boundaries of associated friction surfaces, and rivets which hold the backing plates rigidly to the driven disc are spaced from and hence out of contact with the friction elements. In a preferred form, each friction element includes a radially extending tongue which has a thickness equal to the thickness of the driven disc.

10 Claims, 2 Drawing Sheets

FRICTION DISC ASSEMBLY

BACKGROUND OF THE INVENTION

This invention relates generally to the design and support of friction elements within driven discs of friction clutches. More particularly, the invention relates to the use of unitary friction and load carrying elements adapted for installation in such discs.

Numerous designs of friction disc assemblies have been offered and utilized in the prior art. The more modern of such designs utilize modular forms of construction, wherein the friction elements are pre-assembled and secured to a backing plate or support member. The support member is in turn secured, typically by riveting, to a clutch driven disc assembly which is ultimately installed in a friction clutch. Use of modular construction produces a system involving fewer construction steps, and reduces the cumulation of tolerances giving rise to final machining steps. In addition, where friction elements are secured to a backing plate, there always remains a possiblity of an element becoming unsecured from the plate due to poor bonding quality or an insufficient weld connection.

SUMMARY OF THE INVENTION

The friction disc assembly of this invention includes a plurality of unitary friction elements disposed rigidly within circumferentially spaced openings in a clutch driven disc. Each unitary element includes a pair of planar opposed friction surfaces designed to carry torque transmitted friction loads in a dry friction clutch environment. In a preferred form, each opening is sized to accommodate one friction element under an interference fit with a pair of opposed backing plates, a plate of each pair being positioned on one side of each friction element.

Opposed plates are secured to each other by rivets which extend through the driven disc. Also in the preferred form, the rivets have no direct contact with the friction elements, as the elements are suspended between the boundaries of aligned openings in associated pairs of the backing plates. Each friction element has a circumferentially extending tongue which assures the capacity of the backing plates to axially clamp the element.

DETAILED DESCRIPTION OF THE PREFERRED EMBODIMENTS

Figure 1:
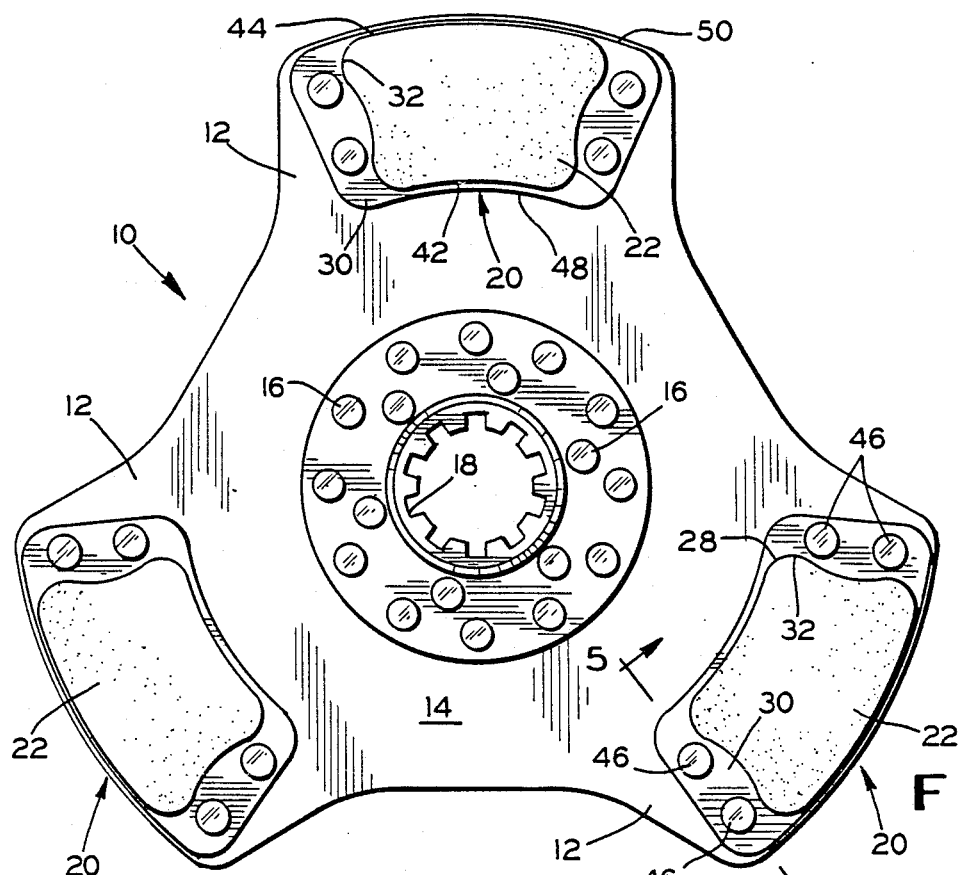
FIG. 1 is a side view of a friction disc assembly which incorporates embodiment of the present invention.

Referring initially to FIG. 1, a clutch driven disc 10 is shown apart from a friction clutch (not shown) in which it is designed to operate. The driven disc 10 includes three circumferentially spaced friction element support segments 12 which extend radially from a central disc portion 14. The disc portion 14 is secured by a set of rivets 16 to a splined hub 18. The hub, in turn, is designed for coupling to a splined engine propshaft (not shown).

Figures 2, 3:
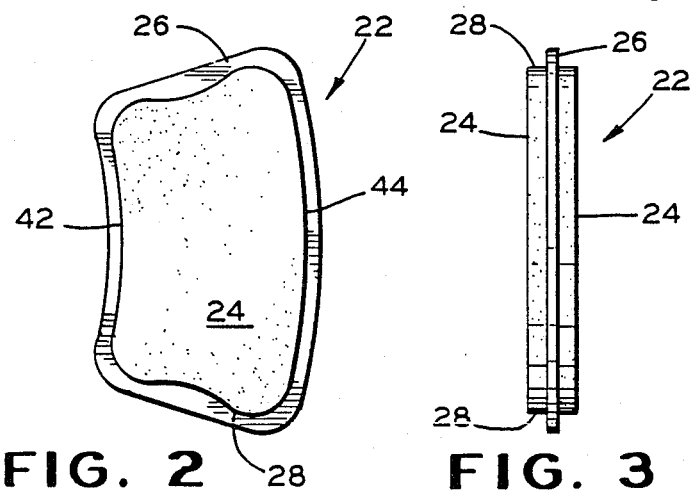
FIG. 2 is a side view of a preferred embodiment of a two-sided unitary friction pad utilized in the present invention.
FIG. 3 is an end view of the friction pad of FIG. 2.

Each of the friction element support segments 12 contains a friction pad assembly 20, which includes a unitary friction pad 22. Referring momentarily to FIGS. 2 and 3, each friction pad 22 includes a pair of radially extending, opposed friction surfaces 24. A circumferentially extending, is axially centered between the surfaces 24, and tongue 26 provides a means for securement and retention of each friction pad 22. Each pad 22 also defines a pair of boundary edges 28, each of which extends circumferentially about one of the friction surfaces 24.

Figure 5:
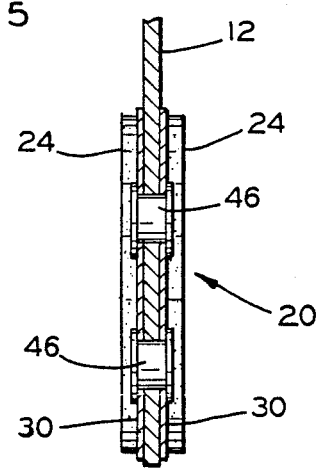
FIG. 5 is a sectional view along lines 5—5 of FIG. 1.

Referring now to FIGS. 1 and 5, each friction pad assembly 20 includes an individual friction pad 22 and a pair of backing plates 30 having openings designed to accommodate the axially aligned boundaries which define the edges 28 of the friction pad surfaces 24. The backing plate openings define boundaries 32 which engage, preferably under an interference fit, the boundary edges 28 of the friction pads. Securement of the friction pad assemblies 20 within the friction element support segments 12 is achieved by sets of backing plate rivets 46 which extend through both backing plates as well as through the associated support segment 12.

Figure 4:
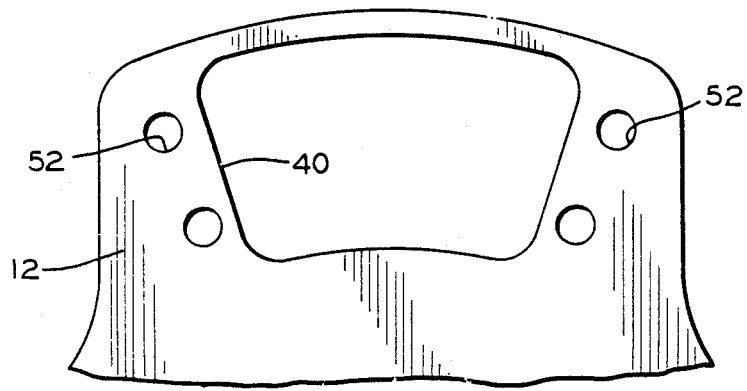
FIG. 4 is a fragmentary view of friction element support segment of the driven disc of FIG. 1, shown without the friction pad assembly incorporated therein.

Referring more particularly to FIG. 4, each friction element support segment 12 includes a friction pad aperture 40 and one set of rivet apertures 52 designed to accommodate the backing plate rivets 46. It will be apparent by reference to FIGS. 2 and 4 that each friction pad 22 will be contained within one friction pad aperture 40 during assembly, and retained by a pair of backing plates riveted against opposing sides of one segment 12 to thereby clasp and confine the friction pad 22.

It will further be appreciated by those skilled in the art that the friction pad will not be subject to localized loading, as it would be if the rivets were installed through the pad per se. Instead, the axially oriented friction surface boundary edges 28 are subjected only to uniformly applied radial loads imposed upon the friction pads by the backing plates. The interference fit between each friction surface boundary edge 28 and each backing plate opening boundary 32 will assure against vibration and chatter noise.

One preferred material for manufacture of the friction pad is a copper base powdered metal. The latter has been determined by this inventor to provide an extraordinary heat sink, as well as to carry a relatively high compression capacity, although weak and shear and tensile capacities. Those skilled in the art will particularly appreciate that the manner of support of the friction pad 22 will insure that shear and tensile loads on the member 22 are minimized.

In the preferred form of the invention, the preferred size tolerance range between each backing plate opening boundary 32 and an associated friction surface boundary 28 is approximately one to three thousandths of an inch maximum. This will assure the interference fit necessary to retain a compression load on the pad 22 at all times for avoiding vibration and resultant chatter. Also, it will noted that in the preferred form as described herein, the circumferential tongue 26 of each pad has a thickness equal to the thickness of the segment 12. Referring to FIG. 2, the tongue extends continuously radially outwardly of the two opposed friction surfaces at all points about the friction faces 24. Alternative embodiments can be envisioned in which the tongues would not be continuously extending. Moreover, it will be noted in reference to FIG. 5 that the opening boundaries 32 of pairs of backing plates 30 are radially aligned with each other in the preferred embodiment described herein, and, in reference to FIG. 3, that the friction surfaces 24 are spaced axially of the tongue 26 by equidistant amounts.

Those skilled in the art will also appreciate that the innermost and outermost boundaries 42 and 44 of each friction pad 22 will lie radially within the innermost and outermost boundaries 48 and 50 of each associated backing plate 30. This will assure that the perimeters of the backing plates are sufficient to completely retain the pads 22 regardless of the design, configuration, or sizing of the relative members. Those skilled in the art will also appreciate the fact that use of a unitary friction pad 22 will eliminate the typical tolerance build-up associated with use of multiple parts, so that machining steps after final assembly may be avoided. Moreover, the possibility of the pad becoming loose from a backing plate due to a bad bond or a poor weld is completely eliminated.

Although only one preferred embodiment has been described and detailed herein, the following claims envision numerous other embodiments which will fall within the spirit and scope thereof.

What is claimed is:

1. In a friction disc assembly adapted for use in a friction clutch, said assembly comprising an annular clutch disc having a plurality of radially extending torque transmitting support segments uniformly spaced circumferentially apart absent an axis; an improvement comprising each support segment including an opening, a unitary friction pad disposed rigidly within each segment opening, each pad defining a circumferentially extending axially centered tongue and a pair of opposed radially extending friction surfaces, each friction surface spaced axially from said tongue, each friction surface defining an axially extending, circumferentially continuous boundary, a pair of axially opposed backing plates, each backing plate defining an opening, said openings being radially aligned, each opening defining a boundary substantially aligned with said continuous boundary of one associated friction surface, each friction surface axially protruding beyond the exterior surface of each associated backing plate, wherein said backing plates are axially juxtaposed against and axially retain only said tongue portion of each friction pad, and wherein said boundary of said plate opening provides a bearing surface under an interference fit with said associated axially aligned friction surface boundary for supporting radially imposed loads on said friction pads.

2. The friction disc assembly of claim 1 wherein said tongue of each friction pad has a thickness equal to the thickness of said associated support segment.

3. The friction disc assembly of claim 2 wherein said friction pads comprise a copper base material.

4. The friction disc assembly of claim 3 wherein each plate of each pair of said backing plates is riveted to the other plate of said pair against opposing sides of said associated support segment 5. The friction disc assembly of claim 4 wherein said boundary of each plate opening and associated friction surface boundary together define an interference fit having a radial tolerance one to of three to five thousandths of an inch.

6. The friction disc assembly of claim 5 wherein the radially innermost and outermost boundary of said friction surface of each friction pad lies radially within the radially innermost and outermost boundries of each associated backing plate.

7. The friction disc assembly of claim 6 wherein said tongue on said friction pad extends radially outwardly of said friction surfaces at all points about said friction pad.

8. The friction disc assembly of claim 7 wherein said friction surfaces are spaced by equidistant axial amounts from said tongue.

9. The friction disc assembly of claim 8 wherein said rivets are spaced apart from said tongues, and pass only through said support segments and associated pairs of said backing plates, whereby said rivets are spaced from said friction pads.

10. The friction disc assembly of claim 9 wherein said openings of each of said pairs of backing plates are radially aligned with each other.

* * * * *